US007223959B2

(12) United States Patent
Fuller

(10) Patent No.: US 7,223,959 B2
(45) Date of Patent: May 29, 2007

(54) PLASMA ABSORPTION WAVE LIMITER

(75) Inventor: Douglas F. Fuller, Grand Prairie, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/185,492

(22) Filed: Jul. 20, 2005

(65) Prior Publication Data

US 2007/0019314 A1 Jan. 25, 2007

(51) Int. Cl.
*H01J 3/14* (2006.01)
*G01J 3/50* (2006.01)
*G02B 5/22* (2006.01)
*F21V 9/00* (2006.01)

(52) U.S. Cl. ...................... 250/216; 250/226; 359/885; 252/582

(58) Field of Classification Search ................ 250/216, 250/214.1, 214 R, 551, 554; 359/885, 890; 356/315, 316; 252/582–589
See application file for complete search history.

(56) References Cited

U.S. PATENT DOCUMENTS

| | | | | |
|---|---|---|---|---|
| 5,280,169 | A * | 1/1994 | Honey et al. | 250/216 |
| 5,347,395 | A * | 9/1994 | Lautenschlager et al. | 359/359 |
| 5,418,640 | A * | 5/1995 | Hood | 359/265 |
| 6,144,512 | A * | 11/2000 | Eden | 359/885 |
| 6,160,661 | A * | 12/2000 | Klocek et al. | 359/359 |
| 2003/0010925 | A1 * | 1/2003 | Watanabe | 250/370.15 |
| 2006/0132906 | A1 * | 6/2006 | Wu et al. | 359/359 |

* cited by examiner

*Primary Examiner*—Georgia Epps
*Assistant Examiner*—Pascal M. Bui-Pho
(74) *Attorney, Agent, or Firm*—Williams, Morgan & Amerson, P.C.

(57) ABSTRACT

A plasma absorption wave limiter is disclosed. The plasma absorption wave limiter comprises a limiting layer and a trigger layer. The limiting layer is transmissive in a pass band of a sensor and capable of generating a reflective and absorptive free electron plasma that will propagate and dissipate therein. The trigger layer is located aft of and in contact with the limiting layer and is capable of residually absorbing incident radiation and initiating the thermal plasma wave in the limiting layer responsive to a threat.

39 Claims, 3 Drawing Sheets

PLASMA ABSORPTION WAVE LIMITER

BACKGROUND OF THE INVENTION

1. Field of the Invention

This invention pertains to optical sensors, and, more particularly, to protection of optical detectors in an optical sensor from damage by radiation in the pass band and field of view of the sensor's detector.

2. Description of the Related Art

Optical sensors are designed to receive and monitor relatively weak optical signals, whether those optical signals are natural or man-made. Thus the sensor's detectors are very sensitive and are therefore vulnerable to damage by high-level radiation, particularly if the radiation source is in the field of view and in the pass band of the sensor's focusing optics. For some applications, the optical detectors in a sensor must be protected from optical signals that are sufficiently strong to damage the detector. The most extreme example is found in military applications. Many military systems employ optical sensors for a variety of tasks. Enemy forces frequently employ counter-measures to incapacitate or damage the sensor with strong optical signals specifically designed to damage sensor(s). For instance, an enemy might illuminate an infrared imager with a high intensity laser capable of damaging the optical detector(s) in the imager. Sensors have been protected from in-band, in-view threats to some extent by mechanical shutters, reflective (notch filter) coatings, notch absorption materials, non-linear distortion and dispersion in a fluid cell, thermochromic elements, two-photon absorption materials and other techniques.

In the IR wavelengths, a thermoreflectance or thermochromic non-linear material ("NLM") like Vanadium Dioxide ("$VO_2$") can be used to modulate radiation almost 100%. This concept has been extended to optical protection and limiting by subsequent research. For example, one protection approach coats the front surface of transmissive optical elements with $VO_2$. In this approach, one of two NLM coated element is placed near a focal surface—typically a plane—through which the optical energy passes on its way to a sensor's detector(s). Below the "switching threshold," the thermochromic NLM is transmissive to optical energy in the pass band of the sensor, that is, it transmits the "normal" optical energy incident upon it. However, above this threshold of irradiance, the NLM becomes reflective; i.e., it is opaque to the potentially damaging optical irradiance.

In the case of $VO_2$, this optical effect is due to a change in the crystal structure and optical characteristics of the material that occurs when the thin film is above a critical temperature. Since temperature is a function of, among other things, the intensity with which the incident energy impinges on the NLM, the coating acts to limit incident radiation transmitted to the sensor detector(s). This intensity is called the "switching intensity"; i.e., the intensity which produces the temperature at which the thermochromic NLM switches from high to low transmission of the incident energy.

In operation, the thermochromic NLM remains transmissive for the optical energy impinging upon it that is within the desired bandwidth and intensity for the optical elements associated therewith. The optical elements behind the NLM and the substrate are thereby able to receive the incident optical energy. When optical energy of dangerous intensity (e.g., a high-powered laser threat) is encountered, the NLM heats up and switches to its reflective state, whereupon the high intensity optical energy is primarily reflected. When the dangerous intensity ceases, the NLM cools down and returns to its transparent, transmissive state. Thus, by reflecting dangerous intensities of optical energy, the NLM protects downstream optical elements (e.g., sensitive detectors) from damage.

Such thermochromic NLM coatings are however also subject to damage from sufficiently intense radiation. If the incident energy is sufficiently intense and of sufficient duration, the energy can melt, vaporize, or delaminate the NLM from its substrate. This degree of intensity is called the "damage threshold." Thus, a NLM protected system whose optical detector(s) remain unharmed by the damaging intensity can still be degraded. To address this issue, a second NLM switch may then placed forward of the first to protect the first element from damage (although this results in some degradation of the sensitivity of the sensor).

One performance characteristic used to assess an optical protection apparatus is its "dynamic range." The dynamic range is the ratio of its switching threshold to its damage threshold. Ideally, the damage intensity should be very large relative to the switching intensity, and so a large dynamic range is desirable. The desire to improve dynamic range for these materials continues to spur efforts at improving the design of reflective limiters employing thermochromic NLMs.

The present invention is directed to resolving, or at least reducing, one or all of the problems mentioned above.

SUMMARY OF THE INVENTION

The invention is a plasma absorption wave limiter. The plasma absorption wave limiter comprises a limiting layer and a trigger layer. The limiting layer is transmissive in a pass band of a sensor and capable of generating a reflective and absorptive free electron plasma that will propagate and dissipate therein. The trigger layer is located aft of and in contact with the limiting layer and is capable of residually absorbing incident radiation and initiating the thermal plasma wave in the limiting layer responsive to a threat.

BRIEF DESCRIPTION OF THE DRAWINGS

The invention may be understood by reference to the following description taken in conjunction with the accompanying drawings, in which like reference numerals identify like elements, and in which.

Figure 1:
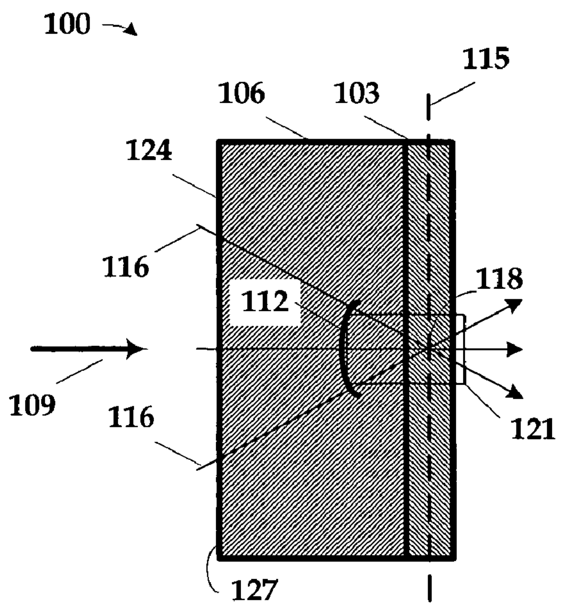
FIG. 1 is a conceptualized cross-sectional view of a plasma absorption wave limiter in accordance with the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In the course of studying thermochromic NLM reflective limiters described above, it was discovered that placing the thermochromic NLM behind a substrate with particular characteristics of conduction band gap energy and melting temperature would provoke a different physical mechanism resulting in a new class of limiters—the plasma absorption wave limiter ("PAWL"). In general, the incident energy passes through the substrate to a trigger layer (e.g. the thermochromic NLM). If sufficiently intense, the energy will heat the trigger layer. The heat energy then conducts from the trigger layer into the substrate. The substrate material is chosen to have a low energy band gap between its bound state electrons and the conduction band (free) electrons. However, the substrate must have a high enough band gap to allow the electrons in the substrate to be bound at normal use conditions so that the material is transmissive in the desired optical pass band of the sensor.

When heat conducts into the substrate, its electron population density in the conduction band will increase rapidly creating a free electron gas or "plasma." Thermally induced conduction band electrons are free to reflect incident radiation just as the conduction band electrons do in a metal. These electrons also absorb incident radiation slightly, further heating the substrate material. The substrate material is chosen to have a high enough melting point that it is not damaged by this initial heating. As the absorbed energy heats the substrate, heat conducts from the plasma region to adjacent transparent dielectric region that is closer to the threat and begins to create plasma in front of the initial plasma region. Thus the plasma absorption region grows and propagates toward the impinging radiation like a wave from the trigger layer.

Since the trigger layer of the PAWL element is preferably located near a focal plane, as the absorption wave propagates toward the source, the free electron population moves into increasingly lower-intensity, less-focused position in the incident radiation pattern. This movement continues until the wave reaches the forward surface of the element or the energy absorbed from the incident radiation is balanced by the conductive heat losses from the plasma into the cooler substrate and related mounting materials. At that point the sensor is protected and the energy is distributed over sufficient material to prevent melting, vaporization or other forms of damage. Thus, the detectors are protected by the trigger layer while the substrate provides the limiting function to protect the trigger layer and thereby increase the dynamic range of the limiter. The PAWL mechanism thus reflects and absorbs the incident radiation before the trigger layer is permanently damaged. Subsequent study has shown that the "triggering" heat provided by the thermochromic NLM can also be provided in alternative ways.

Consider the PAWL 100 shown in FIG. 1. FIG. 1 is a conceptualized cross-sectional view of a PAWL 100 in accordance with the present invention. The PAWL 100 comprises a trigger layer 103—e.g., a thermochromic NLM layer—and a limiting layer 106—e.g., a semiconducting substrate. If the incident energy 109 is sufficiently intense, the trigger layer 103 becomes opaque to protect the detector(s) (not shown) of the associated sensor (also not shown) then continues to absorb slightly and heat the limiting layer 106. This heat generates a plasma wave 112 of free electrons in the limiting layer 106. As heat is conducted away from the plasma and toward the source of radiation, the plasma wave 112 will propagate into the limiting layer 106, which will dissipate the absorbed energy from the incident radiation 109 through conduction. Damaging levels of optical energy will thus be reflected and absorbed to prevent damage to the trigger layer that has already protected the sensitive elements of the sensor system (e.g., its detector array).

The absorption of the plasma wave 112 can be tailored to applications by adjusting the band gap and thermal characteristics of the limiting layer 106. These characteristics can be adjusted by choice of materials, doping (either the bulk material or a thin layer), thermal biasing, and alloys, for example. In general, design tailoring for specific implementations will include considerations such as threat characteristics, ambient operating temperatures, desired reaction time, and sensor performance/design characteristics. Note also that the front surface 127 of the PAWL 100 may be curved to adjust refraction in some embodiments.

More technically, the PAWL 100 is an optical element placed at or near a focal surface 115 in a sensor not otherwise shown. In the illustrated embodiment, the focal surface 115 is a focal plane. However, in alternative embodiments the focal surface 115 may be non-planar, for example, spherical, parabolic, or cylindrical. The lines 116 illustrate the converging rays of the focused threat radiation. As used herein, "threat" means incident energy sufficiently intense to damage the detector(s) of an associated sensor. At the focus 118, incoming energy 109 will be concentrated in a focal pattern; e.g. an Airy diffraction pattern. The trigger layer 103 (primarily transmissive) absorbs some of the incident energy 109. Absorbed energy heats the trigger layer causing it to switch to an opaque state and protect the sensor's detector(s).

Figure 2:
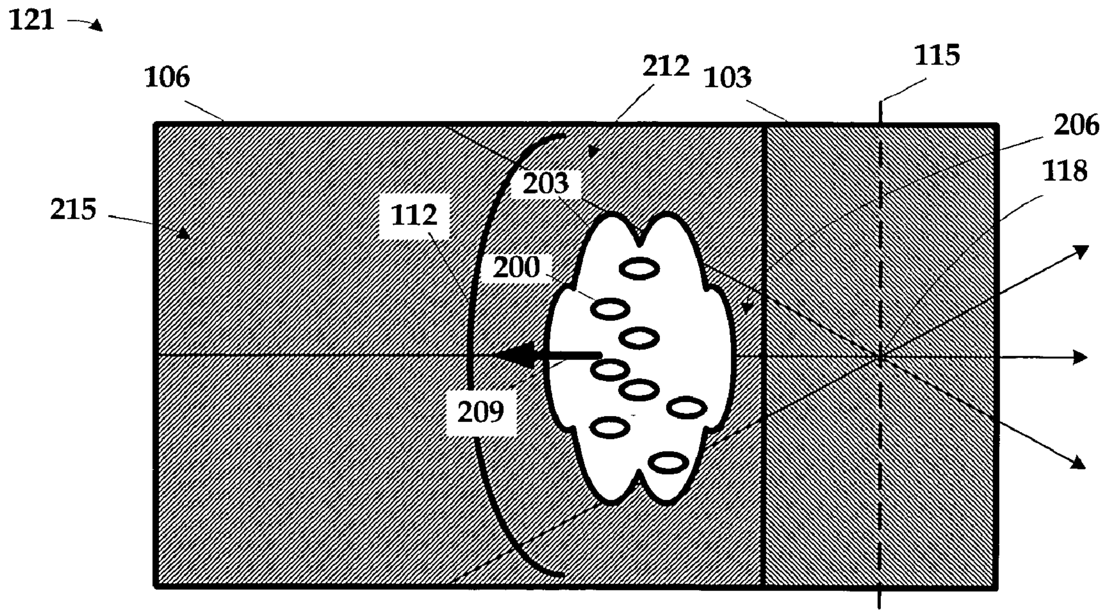
FIG. 2 illustrates a portion of the plasma absorption wave limiter in FIG. 1 in greater detail.

If the radiation continues intensely and long enough (a few milliseconds for some high power lasers), damage, such as melting and vaporization of the trigger layer 103, will begin. However, before this occurs, heat conducts into the limiting layer 106 and thereby rapidly increases the population of charge carriers 200, shown in FIG. 2 (only one indicated), in the conduction band of the limiting layer 106, making it more "metallic." FIG. 2 illustrates a portion 121 of the PAWL 100 in FIG. 1 in greater detail. Some incident energy 109 absorbed by the charge carriers 200 causes further heating of the PAWL substrate near the plasma 212. The resulting "plasma region" 203 of thermally-induced free charge carriers is highly reflective and slightly absorbing such that the previously insulating material of the limiting layer 106 becomes conducting, like a metal. The plasma region 203 then blocks the transmission of the incident radiation 109 to the focus spot 118 in the trigger layer 103.

The heat absorbed in the region 206 is quickly conducted, as represented by the arrow 209, into the adjacent, cooler volume of the PAWL 100; i.e., the zone 212. This causes charge carriers 200 of the plasma 203 to increase in front of the already heated region 203; i.e., the heat conduction induces a free electron population density increase in the zone 212. This newly heated zone 212 is slightly forward of the region 206 where the previous heating occurred, so the incident energy 109 is less concentrated in the newly heated region 212.

This process of thermally induced absorption of the incident energy 109 in the enlarged region of plasma 203 subsequently causes heat that propagates further into the limiting layer 106 toward the source (not shown) of the incident energy 109. The plasma 203 blocks threat transmission to the previously heated region 206. Thus a wave 112 of thermally induced plasma 203 propagates from the triggering layer 103 into the limiting layer 106; i.e., away from the focus 118 and toward the threat.

This absorption wave 112 continues to build and propagate until it reaches the most forward face 124, shown in FIG. 1, of the PAWL 100 or to a region 215 in the PAWL 100 where the threat radiation is defocused enough that heat conducted away from the plasma 203 is in equilibrium with the energy absorbed from the threat. Note that, since the limiting layer 106 absorbs the plasma, the dynamic range of the PAWL 100 can be increased by thickening the limiting layer 106, since the threat intensity decreases away from the focal plane and there is more material to absorb threat energy loads. When the threat is removed, the PAWL 100 cools back to ambient conditions and the absorbing plasma 203 dissipates so that the sensor functions without degradation. Note that active means of cooling the PAWL 100 may be incorporated to expedite the sensor's return to full function.

The PAWL 100 trigger layer 103 may be implemented using, for example, an oxide of vanadium or titanium. The limiting layer 106 is a low-band-gap material that is transmissive in the pass band of the sensor at normal use temperature conditions. It may be made of any material where the band-gap energy of the conduction band is adequately above the energy of the photons in the sensor's pass band. The melting point and strength of the material is selected to be high enough to prevent damage to the PAWL 100 from threat radiation. For example if the sensor is designed for the 8 to 12 micron wavelength region like many infrared ("IR") imagers, the PAWL 100 limiting layer 106 might be made out of Germanium ("Ge"), either pure or slightly doped to tailor its limiting properties.

Many materials are sufficiently transmissive to be used for refractive elements and function in the manner desired. Materials that meet these criteria are numerous and include not only Ge, but also:

(i) for long wave infrared ("LWIR") and medium wave infrared ("MWIR") sensors, limiting layer materials such as GaSb, $ZnSnAs_2$, InAs, InSb, $CuFeS_2$, $CuFeSe_2$, $AgAlTe_2$, $AgInTe_2$, $XnSnAs_2$, $CdGeAs_2$, $CdSnAs_2$, $HgIn_2Se_4$, SnTe, PbSe, PbS, PbTe, BiSe, $AgSbSe_2$, $AgSbTe_2$, $Ag_{19}Sb_{29}Te_{52}$, CdSb, ZnSb, $Bi_2Se_3$, $Mg_2Sn$, $Mg_3Sb_2$, $Cd_3As_2$, TlSe, $Hg_5In_2Te_8$, $CuAlTe_2$, $CuGaSe_2$, $CuGaTe_2$, $CuInSe_2$, $CuInTe_2$, $AgAlSe_2$, $ZnGeAs_2$, $HgIn_2Te_4$ and $Zn_3As_2$ can be considered.

(ii) for shorter wavelength sensors for near infrared ("NIR") and visible applications, higher band gap limiting layer materials such as Si, ZnS, ZnSe, ZnTe, GaP, may be appropriate, (iii) for millimeter wave ("MMW") and microwave sensor applications, lower band gap materials such as InSb, Sn, $Bi_2Te_3$, HgTe, PbSe, $CuFeSe_2$, and PbTe, can be considered.

(iv) for UV and X-ray applications, high band gap materials like C(diamond), BN, BP, GaN, AlN, SiC, and SrS are applicable;

Thus, as is implied above, the choice of materials as well as some other details will be implementation specific depending upon intended use and design constraints.

Figure 3:
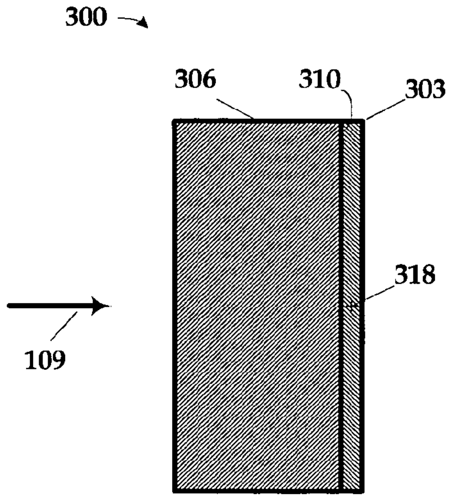
FIG. 3-FIG. 5 illustrate in conceptualized cross-sectional views of alternative embodiments of the plasma absorption wave limiter of FIG. 1.

Turning now to FIG. 3, in one particular embodiment 300, the trigger layer 303 may be implemented as a layer of thermochromic NLM, as is implied above. In this particular embodiment, the limiting layer 306 comprises a Ge- or silicon ("Si")-based semiconducting substrate. The triggering layer 303 may be implemented in, for example, a thermochromic coating of a vanadium oxide deposited on the surface 310 near the focus 318 and its temperature biased below but near the phase change temperature of the NLM. After slight heating, the thermochromic NLM and switches from transmissive to reflecting before the detector is damaged. Heat from the trigger layer 303 then conducts into the PAWL 100 substrate causing a plasma 203 as described above. This heat conductance then protects the trigger layer 303 from damage such as fracture, melting, vaporization, delamination, etc.

The trigger layer 303 may be fabricated on the limiting layer 306 using solid state material fabrication and thin film deposition techniques as are commonly known in the semiconductor and optical component fabrication arts. In general, techniques used for depositing thermochromic NLMs on the forward face of the semiconducting substrates described above for conventional reflective limiters may be readily adapted to fabricating the trigger layer 303 on the rear face of the substrate in this particular embodiment of the present invention.

Figure 4:
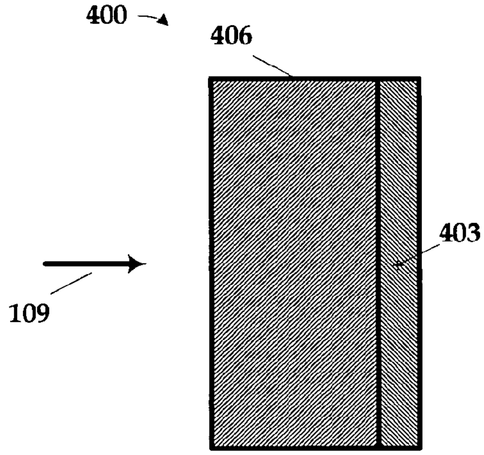

One particular form of deposition that may be used is known as epitaxial growth, and is illustrated in FIG. 4. Epitaxial growth describes a process by which a film or layer of one material is "grown" on a substrate. One suitable technique for this process is known as "chemical vapor deposition," wherein a substrate is placed in a chamber and a chemical vapor is introduced into the chamber. Over time, under proper temperature and pressure, the chemical vapor will deposit on the substrate in a crystalline film. An overview of this and other epitaxial growth techniques may also be found in any of several thin film and microchip fabrication handbooks. Any suitable epitaxial growth process known to the art may be used.

Figure 5:
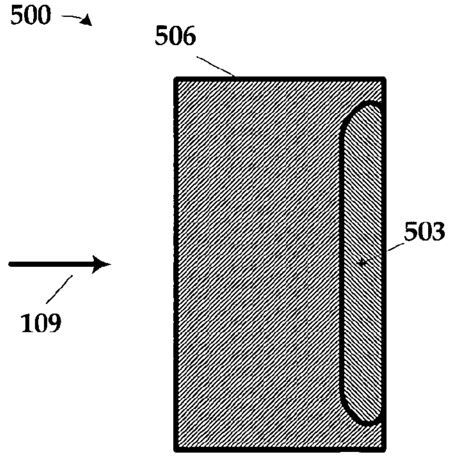

Alloys of silicon and germanium ("Si—Ge") or materials doped with impurities to adjust band gap may also be used depending on the threat characteristics, required reaction time and other sensor performance or design trade issues. FIG. 5 illustrates an embodiment 500 in which a trigger layer 503 is formed by doping a Si- or Ge-based semiconducting substrate that is the limiting layer 506. Doping techniques are also well known in the semiconductor fabrication arts. For instance, well known ion implantation techniques are commonly used for doping purposes. An overview of this and other doping techniques may also be found in any of several thin film and microchip fabrication handbooks. Any suitable doping techniques known to the art may be employed.

As was mentioned above, the PAWL 100 is preferably located at or near the focal surface 115. To block the incident energy 109 quickly (before damage to the detector) the PAWL 100 should be placed either immediately forward of the detector array or in a secondary focal plane (reimager) between the sensor's objective aperture and detector. This largely results from the desire to maximize the dynamic range in a given embodiment and the fact that the intensity of the incident energy will be highest at the focal point 118. However, this is not necessary to the practice of the invention. All that is required is that the PAWL 100 be located at a position at which the intensity of the incident energy is strong enough to generate the plasma as described above before the sensitive elements of the sensor or the PAWL 100 trigger layer damage.

Figure 6:
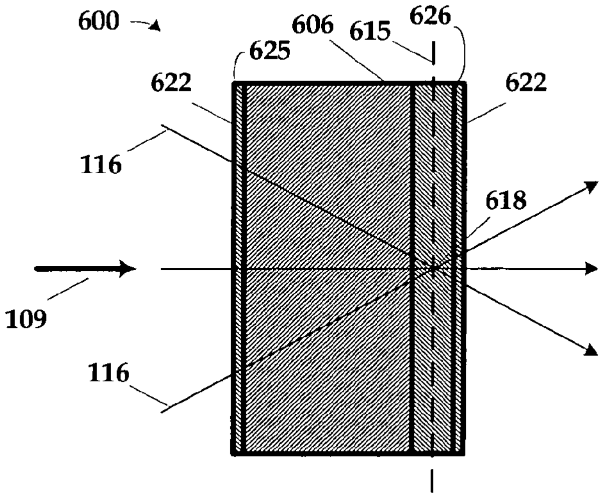
FIG. 6 illustrates in a conceptualized cross-sectional view one particular implementation of the embodiment of FIG. 2.

FIG. 6 illustrates a one particular implementation of a PAWL 600 in a conceptualized cross-sectional view. The PAWL 600 includes a trigger layer 603—e.g., a thermochromic NLM layer—and a limiting layer 606—e.g., a semiconducting substrate. The trigger layer 606 residually absorbs the incident energy 609, laser radiation, for example to generate a plasma wave (not shown) of free electrons that propagates into the limiting layer 606. The limiting layer 606 then dissipates the plasma wave through absorption. The PAWL 600 is placed at the focal plane 615. The PAWL 600 also includes optional anti-reflective coatings 622 on the front and rear surfaces 625, 626 to reduce element transmission losses.

Figure 7:
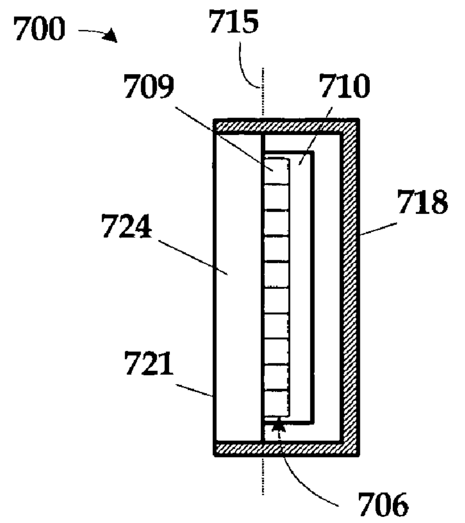
FIG. 7 illustrates an exemplary use for the present invention in partial cross-section, in which an optical assembly employs a plasma absorption wave limiter.

FIG. 7 illustrates but one exemplary use for the present invention in partial cross-section, in which an optical assembly 700 employs a PAWL limiting layer 724. The PAWL limiting layer 724 protects the detector array 706, which comprises an array of detector elements 709 (only one indicated), of a detector assembly 710. Note that the PAWL limiting layer 724 is positioned so that it is in contact with the detector array 706 that also serves as the PAWL triggering layer. The detector (trigger layer) 706 is positioned at or near the focal surface 715 of the optical sensor (not shown). The assembly 710 is housed in a thermal control apparatus 718 to control the operating temperature of the assembly 710. The thermal control apparatus 718 may be any suitable means known to the art, such as a cryogenic temperature-controlled dewar. Note that the front surface 721 of the limiting layer 724 may be configured to function as a cold window, a band-pass filter, and/or a field lens. As will be appreciated by those skilled in the art having the benefit of this disclosure, the optical assembly 700 will include additional, routine features such as support components, electronics, thermal conditioning components, and thermal isolation components. These features have been omitted for the sake of clarity and so as not to obscure the present invention.

Figure 8:
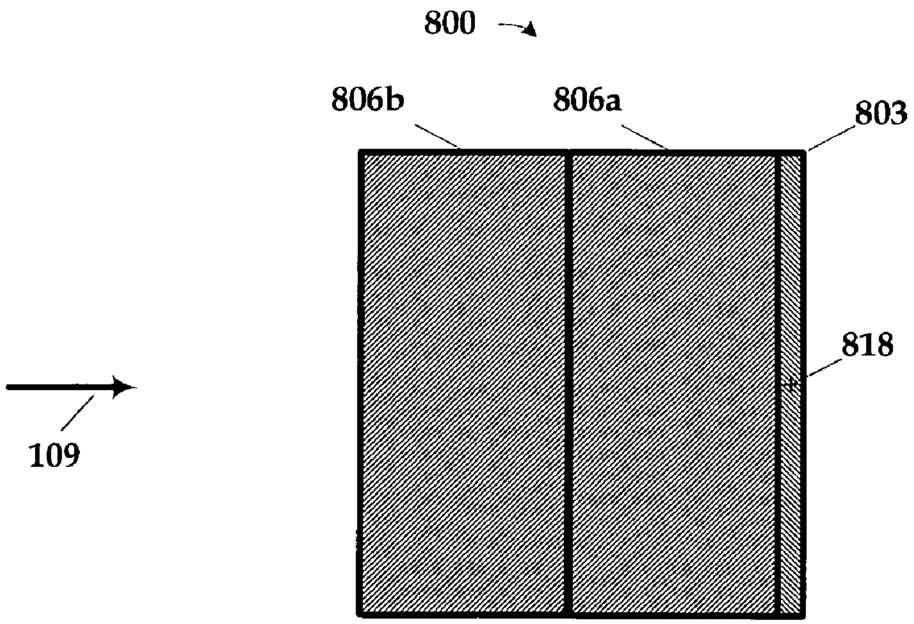
FIG. 8 illustrates another embodiment of the present invention.

Those in the art may realize further variations on the embodiments disclosed above that are also within the scope of the invention as claimed below. For example, referring now to FIG. 8, one particular embodiment 800 includes a trigger layer 803 and multiple limiting layers **806*a* and 806*b*. The trigger layer 803 is a layer of thermochromic NLM near the focus 818 and the limiting layer 806*a* is a semiconducting substrate with a low band gap, e.g. germanium. The embodiment 800 furthermore includes a second limiting layer 806*b*, which may also be a semiconducting substrate with a band gap higher than layer 806*a*; e.g. silicon. The temperature of the trigger layer 803** is biased below but near the phase change temperature of the NLM.

After slight heating by threat radiation 109, the thermochromic NLM that is the trigger layer 803 switches from transmissive to reflecting before the detector is damaged. The trigger layer continues to heat but then heat from the trigger layer 803 conducts into the limiting layer **806*a* causing a plasma (not shown) as described above. The plasma protects the trigger layer from damage and if there is enough heat (from a severe threat 109), the plasma wave in the limiting layer 806*a* may expand to the front surface of layer 806*a*. Heat from layer 806*a* then conducts into 806*b* to induce a plasma in the second limiting layer 806*b*. Thus, the limiting layer 806*a* may also function as a trigger layer for the second limiting layer 806*b*. Thus, a thermally induced plasma in both the first limiting layer 806*a*, and subsequent limiting layers 806*b***, etc. then protects its respective trigger layer from damage such as fracture, melting, vaporization, delamination, etc.

Thus, in its many manifestations and aspects, the present invention uses a thermally-induced conduction-band plasma wave in a solid-state material to passively block intense radiation. It thereby provides a number of benefits over and above the state of the art, including:

- it provides an automatic, low-loss means to protect optical sensors from damage by high-intensity light from a laser;
- it provides sensor protection from other damaging sources within the wavelength range that the sensor is designed to detect and that would cause thermal damage to a sensitive component such as the sensor's detector or focal plane array;
- it provides protection from threats in the pass band of the sensor without degrading sensor performance when a threat source is not present;
- it reacts to any wavelength in the sensor pass band and is thus more robust to evolving threats than a spike filter for a specific laser wavelength;
- it is passive and requires no sensors, actuators and control electronics as does a mechanical shutter;
- it can be designed to work over a large range of ambient temperatures from cryogenic to refractory;
- it is tolerant of wide variation in ambient acceleration, shock and vibration unlike fluid cells, resonant etalons or pellicles;
- it is unobservable from outside the sensor;
- it is quick reacting, compact and light weight compared to shutters;
- it can be tailored to a wide range of sensor bands from the microwave to x-ray;
- it does not require prior knowledge of the threat wavelength like notch filters or notch absorbers;
- it protects against extreme threat levels that would damage other protection equipment like thermochromic limiters; and
- it is easier to design and fabricate than many other technologies.

Note that not all embodiments of the present invention will necessarily exhibit all these advantages.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A plasma absorption wave limiter, comprising:

a limiting layer transmissive in a pass band of a sensor and capable of generating a reflective and absorptive free electron plasma that will propagate and dissipate therein; and a trigger layer located aft of and in contact with the limiting layer and capable of residually absorbing incident radiation and initiating the free electron plasma in the limiting layer responsive to a threat.

2. The plasma absorption wave limiter of claim 1, wherein the limiting layer comprises a solid semiconducting substrate capable of transmitting incident energy in a desired wavelength band.

3. The plasma absorption wave limiter of claim 2, wherein the trigger layer comprises a thin film coating on the substrate, an epitaxially grown impurity layer on the substrate, or an impurity layer implanted in the substrate.

4. The plasma absorption wave limiter of claim 3, wherein the thin film coating comprises a thermochromic, non-linear material.

5. The plasma absorption wave limiter of claim 2, wherein the semiconducting substrate has a low band-gap and a high melting temperature.

6. The plasma absorption wave limiter of claim 1, wherein the trigger layer is located at or near a focal surface of a plurality of associated focusing elements.

7. The plasma absorption wave limiter of claim 6, wherein the trigger layer is located at the focal surface.

8. The plasma absorption wave limiter of claim 1, further comprising at least one of an anti-reflective coating on the triggering layer or the limiting layer.

9. The plasma absorption wave limiter of claim 1, wherein the trigger layer comprises a detector.

10. The plasma absorption wave limiter of claim 1, further comprising a second limiting layer positioned forward of and in contact with the first limiting layer and in which a second thermal plasma wave may be triggered by the first limiting layer.

11. A plasma absorption wave limiter, comprising:

an optically transmissive substrate including a forward face and an aft face relative to a direction of propagation of threat optical energy incident thereon; and a film formed on the aft side of the transmissive substrate capable of residually absorbing incident energy from a threat that heats the substrate, causing the substrate to generate a plasma wave therefrom that propagates and dissipates into the substrate.

12. The plasma absorption wave limiter of claim 11, wherein the film comprises a thin film coating on the substrate, an epitaxially grown impurity layer on the substrate, or an impurity layer implanted in the substrate.

13. The plasma absorption wave limiter of claim 12, wherein the thin film coating comprises a thermochromic, non-linear material.

14. The plasma absorption wave limiter of claim 13, wherein thermochromic, non-linear material comprises an oxide of vanadium or titanium.

15. The plasma absorption wave limiter of claim 11, wherein the substrate has high transmission in a pass band of a sensor, a low band-gap and a high melting temperature.

16. The plasma absorption wave limiter of claim 11, wherein the film is located near the focal surface of a plurality of associated optical elements.

17. The plasma absorption wave limiter of claim 16, wherein the film is located at the focal surface.

18. The plasma absorption wave limiter of claim 11, further comprising at least one of a tuned-multilayer, optically-active coating on the triggering layer or the limiting layer.

19. The plasma absorption wave limiter of claim 11, further comprising a second optically transmissive substrate positioned forward of and in contact with the first optically transmissive substrate and in which a second plasma wave may be triggered from the first optically transmissive substrate.

20. An optical assembly, comprising:

a plasma absorption wave limiter, including:

a limiting layer transmissive in a pass band of a sensor and capable of generating a reflective and absorptive free electron plasma that will propagate and dissipate therein; and a trigger layer that is also a reverse-lit detector that absorbs incident radiation to provide both electrical signals and trigger heat and that is located aft of and in contact with the limiting layer and capable of initiating the thermal plasma wave in the limiting layer responsive to a threat;

a sensor including a detector protected by the plasma absorption wave limiter; and a thermal control apparatus in which the sensor is housed to control the operating temperature of the sensor.

21. The optical assembly of claim 20, wherein the front surface of the limiting layer is designed to function as at least one of a vacuum seal, a cold window, a band-pass filter, or a field lens.

22. The optical assembly of claim 20, wherein the trigger layer comprises the detector.

23. The optical assembly of claim 20, wherein the detector includes an array of detector elements.

24. The optical assembly of claim 20, wherein the thermal control apparatus includes means for cooling the sensor.

25. The optical assembly of claim 24, wherein the cooling means comprises a temperature controlled dewar.

26. The optical assembly of claim 20, wherein the thermal control apparatus includes a temperature controlled dewar.

27. An optical apparatus, comprising:

a plasma absorption wave limiter, including:

a limiting layer transmissive in a pass band of a sensor and capable of generating a reflective and absorptive free electron plasma that will propagate and dissipate therein; and a trigger layer located aft of and in contact with the limiting layer and capable of residually absorbing incident radiation and initiating the free electron plasma in the limiting layer responsive to a threat; and a plurality of optical elements located aft of the plasma absorption wave limiter relative to a direction of propagation of the optical energy.

28. The optical apparatus of claim 27, wherein the limiting layer comprises a semiconducting substrate capable of transmitting incident energy in a desired wavelength.

29. The optical apparatus of claim 28, wherein the trigger layer is located at a point corresponding to the focal surface of a plurality of associated optical elements.

30. The plasma absorption wave limiter of claim 28, further comprising at least one anti-reflective coating on the triggering layer or the limiting layer.

31. The plasma absorption wave limiter of claim 28, wherein the plurality of optical elements comprise a LADAR receiver or imaging infrared sensor.

32. The optical assembly of claim 28, wherein the trigger layer comprises the detector.

33. An optical assembly, comprising:

a plasma absorption wave limiter, including:

an optically transmissive substrate including a forward face and an aft face relative to a direction of propagation of optical energy incident thereon; and a triggering layer positioned aft of and in contact with the transmissive substrate and capable of detecting incident energy until threat energy heats the triggering layer and a surface of the substrate, causing the substrate to generate a plasma wave therefrom that propagates and dissipates into the substrate;

a sensor including a detector protected by the plasma absorption wave limiter; and a thermal control apparatus in which the sensor is housed to control the operating temperature of the sensor.

34. The optical assembly of claim 33, wherein the front surface of the limiting layer functions as at least one of a vacuum seal, a cold window, a band-pass filter, or a field lens.

35. The optical assembly of claim 33, wherein the trigger layer comprises the detector.

36. The optical assembly of claim 33, wherein the detector includes an array of detector elements.

37. The optical assembly of claim 33, wherein the thermal control apparatus includes means for cooling the sensor.

38. The optical assembly of claim 37, wherein the cooling means comprises a temperature controlled dewar.

39. The optical assembly of claim 33, wherein the thermal control apparatus includes a temperature controlled dewar.

* * * * *